United States Patent [19]

Goldberg

[11] Patent Number: 4,656,591
[45] Date of Patent: Apr. 7, 1987

[54] ORDER PROCESSING METHOD AND APPARATUS (II)

[75] Inventor: Stanley Goldberg, Roseland, N.J.

[73] Assignee: Goody Products, Inc., Kearny, N.J.

[21] Appl. No.: 776,983

[22] Filed: Sep. 12, 1985

Related U.S. Application Data

[63] Continuation of Ser. No. 485,841, Apr. 18, 1983, abandoned, which is a continuation-in-part of Ser. No. 463,487, Feb. 3, 1983, abandoned.

[51] Int. Cl.[4] .................. G06F 15/20; G06F 15/226; G06F 15/24
[52] U.S. Cl. .................................... 364/478; 235/385; 364/403; 364/900
[58] Field of Search .............. 364/900, 200, 478, 403, 364/464, 466, 479, 403; 235/385, 383, 424, 425, 91 L; 221/1; 414/134, 135, 136; 198/349, 350, 502, 503, 856; 187/7, 55, 58; 209/552, 564–565, 566, 509

[56] References Cited

U.S. PATENT DOCUMENTS

| | | | |
|---|---|---|---|
| 3,637,989 | 1/1972 | Howard et al. | 235/385 X |
| 3,647,026 | 3/1972 | Alexander et al. | 186/1 C |
| 3,688,087 | 8/1972 | Howard et al. | 364/478 |
| 3,743,090 | 7/1973 | Brown et al. | 209/566 |
| 3,770,941 | 11/1973 | Gechele et al. | 235/385 X |
| 4,168,828 | 9/1979 | McLear | 364/478 |
| 4,264,369 | 4/1981 | Stewart | 235/385 |
| 4,336,589 | 6/1982 | Smith et al. | 364/900 X |
| 4,360,887 | 11/1982 | Wilson et al. | 364/478 X |
| 4,363,693 | 12/1982 | Fujii et al. | 364/478 X |
| 4,509,123 | 4/1985 | Vereen | 364/403 X |
| 4,544,064 | 10/1985 | Felder | 382/61 X |

FOREIGN PATENT DOCUMENTS 139579 5/1977 Japan .................................. 414/136

OTHER PUBLICATIONS

Ingram, "New Dimensions in Package Coding", *Mechanical Handling*, Feb. 1970, pp. 40–46.

Primary Examiner—Jerry Smith
Assistant Examiner—Jon D. Grossman

[57] ABSTRACT

An item characterizing code on each of a succession of items of different varieties loaded onto a conveyor is compared to item characterizations in the requirements of a succession of stored orders to select an order requiring each item and, in dependence on the order that is selected, sorting the articles to order-related locations and/or applying order-related labels to the items. Multiple selective printers may be provided for use in succession for successive labels.

18 Claims, 20 Drawing Figures

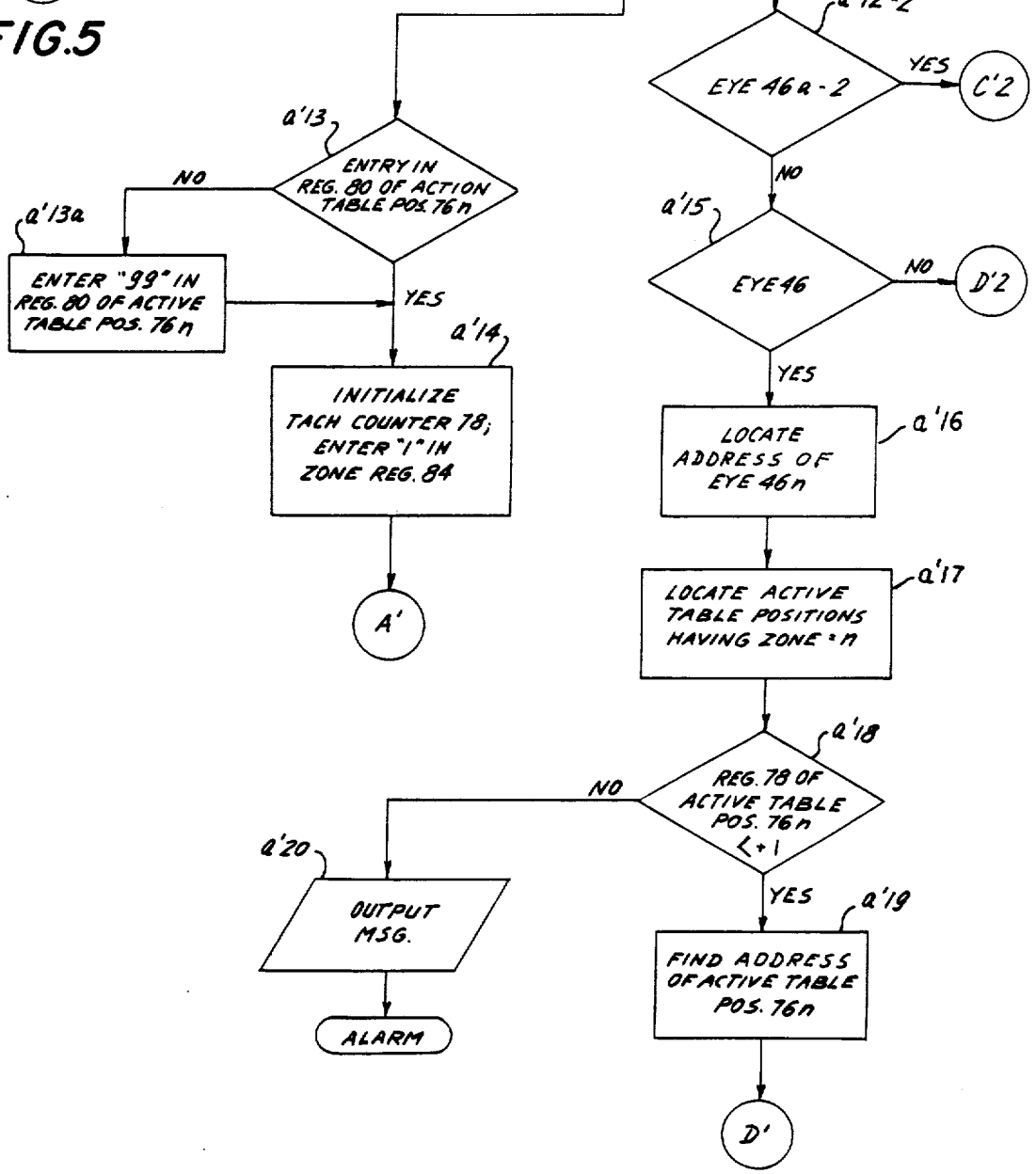

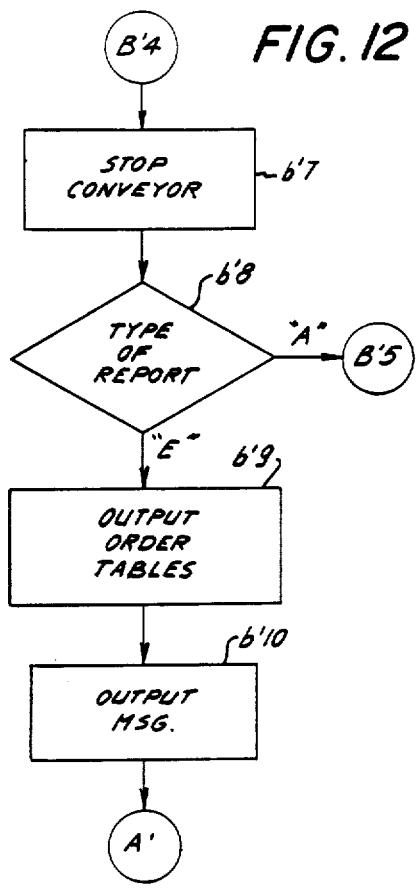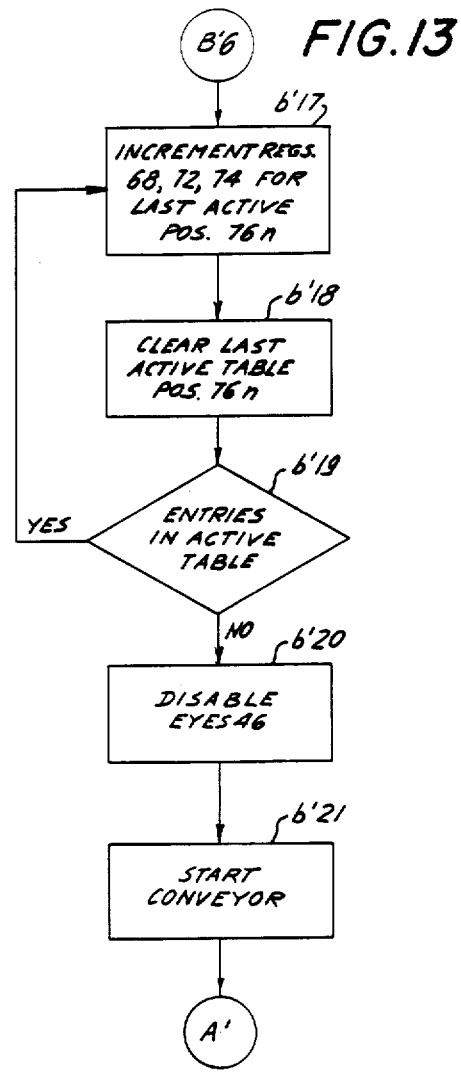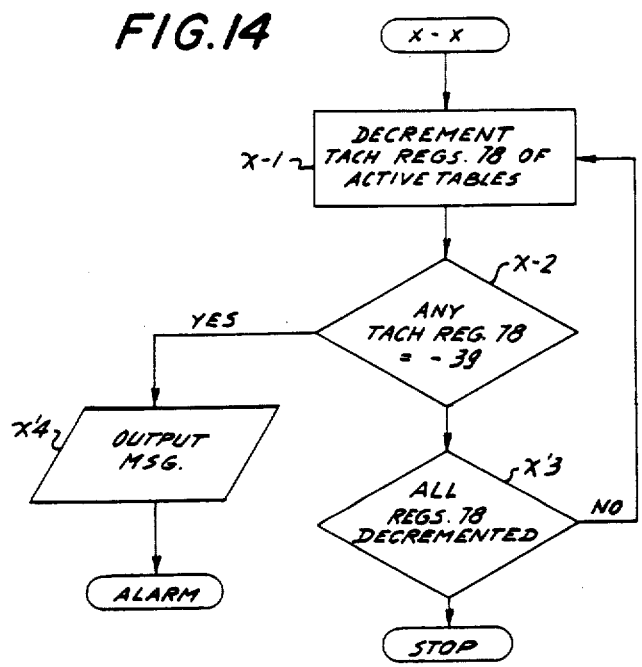

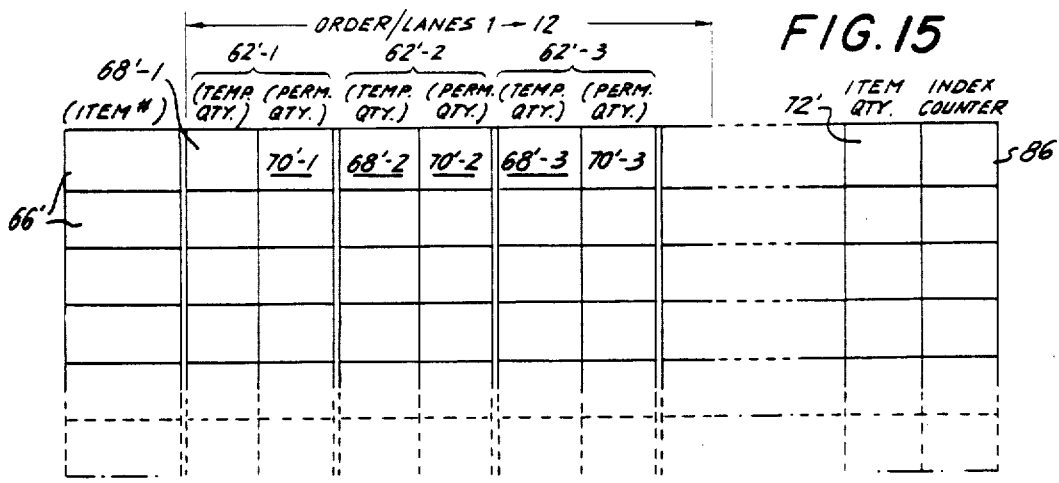
FIG. 15
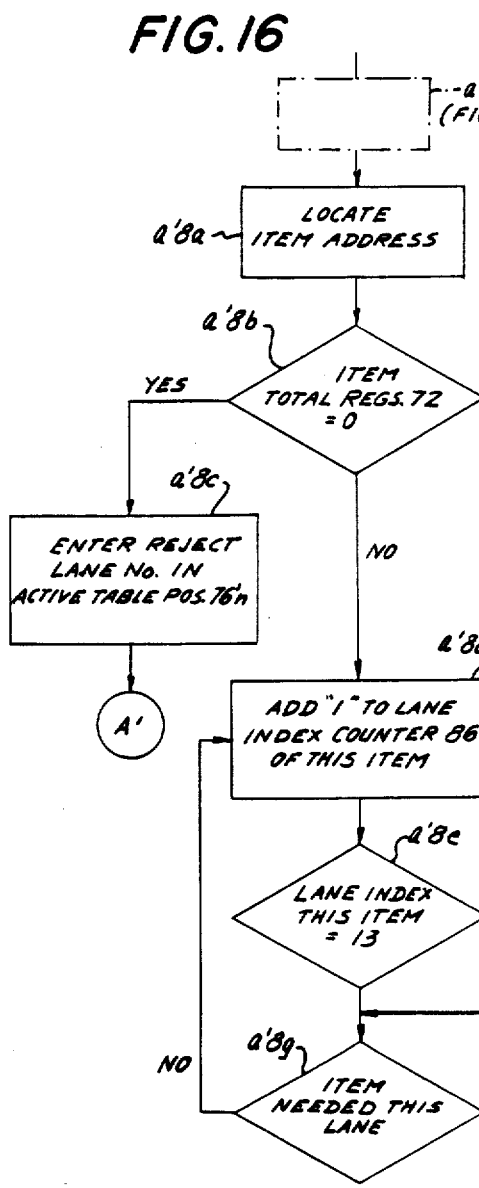
FIG. 16
FIG. 17A   FIG. 17C
FIG. 17B

ORDER PROCESSING METHOD AND APPARATUS (II)

The present application is a continuation of Ser. No. 485,841, filed 4-18-83, as well as a continuation-in-part of my application Ser. No. 463,487 filed Feb. 3, 1983, both abandoned, all of which is incorporated herein by reference.

This application relates to apparatus for labeling packages and to apparatus for labeling and sorting packages, and to corresponding methods.

BACKGROUND OF THE INVENTION

A large amount of effort has been devoted to improving the efficiency of assembling orders of merchandise in warehouses, and in expeditiously labeling the ordered merchandise preparatory to shipping it to consignees, typicaly to retailers. In a proposed system, a computer stores all of the data representing orders of various consignees, and the computer is programmed to print labels for each item in each order. Warehouse personnel then pick from stock the items identified by the labels. Each label has man-readable data related to the order's consignee, such as the consignee's name and the consignee's selling price for that item. Each label also bears a bar code that uniquely identifies that specific package in the day's operations, used later in sorting the picked packages and in accounting.

That system depends on accuracy of the personnel in picking merchandise from inventory and in applying the labels. Printed labels for items not in inventory are not only wasted, but such labels must be read into the computer to reveal ordered but not-shipped merchandise. If automated picking were used in such a system, the warehouses organization would of necessity become tightly organized all the way from the storage bins to the shipping docks, becoming correspondingly inflexible in many respects and costly. Such a system is practical only for limited application.

SUMMARY OF THE INVENTION

An object of this invention resides in providing a novel apparatus and method for labeling packages of items with data related to the consignees of the packages, plus optional additional data.

A further object of the invention resides in providing novel order-processing apparatus and methods that avoid many of the complications and limitations of the systems outlined above.

Many manufacturing provide a service of "pre-ticketing" or labeling each package with the customer's selling price of each package. If stocks of various items are preticketed for various consignees and stored in readiness for filling orders, the stock of each preticketed item of each consignee must be stored separately. The number of stocks of items requiring separate storage would in effect be multiplied. Moreover, the total warehouse inventory would be increased correspondingly, and there is an inherent risk that items preticketed for one consignee may be picked in filling another consignee's order. Even if picked supplies of items are preticketed immediately before assembling the items to fill an order, the preticketing operation entails added expense and it complicates management of the warehouse.

A still further object of the invention resides in novel apparatus and methods for pre-ticketing merchandise in a way that avoids or ameliorates the foregoing disadvantages.

Another object of the invention resides in providing novel apparatus and methods for dependably applying a shipping label to each separately handled item in a shipment, as part of a high-integrity system of filling orders and developing dependable shipping records as a basis for billing.

The foregoing object finds application in shipments from a warehouse to a retailer, but it also has other applications. For example, corresponding considerations apply to supplying books or sound recordings ordered by subscribers in a plan that offers multiple choices. Each item being processed is checked against subscriptions stored in a computer. When an item is needed for a subscription, it is labeled with the address of a subscriber who ordered that item and an entry is made against that subscription showing that the item has been supplied.

The foregoing and other objects, advantages and novel features of the invention in its various aspects are achieved in the illustrative embodiment that is described in detail below and shown in the accompanying drawings. Orders to be processed are stored in a computer. The packages in inventory bear machine-readable codes that identify or characterize the package contents. Scanning of a package triggers a search in the computer storage to select an order requiring that item. The match between the item characterization and a requirement for that item in a selected order results in labeling of the scanned package with data related to the selected order including derived data. Such data may take the form of the selling price of that item established by the consignee, optionally with the consignee's name, or it may take the form of a complete shipping label. Coordinately, the stored record of the quantity requirement in the selected order for that item is adjusted to reflect the allocation of that package to that order.

In the example of orders representing a subscription list, an order of a subscriber for any item (e.g. a book title) is satisfied after allocation of but one package to a designated consignee. Plural packages of any one item may appear in a retail establishment's order for an item. The package may be only one unit of an item. Otherwise the package may be a one-dozen carton of like units (for example) or a multiple-gross case of an item. Allocation of each package to an order is registered in the computer in any suitable manner, whether to reduce the registered quantity requirement for the order or to provide a separate record of quantities of each of the items allocated to that order. When the number of allocated units of an item reaches the number of units required in the order, that order is in effect erased from the subsequent order-selection process. Accordingly, when a package has been scanned to determine its item identity, the package is allocated to a selected order, the package is labeled with data related to the consignee, and the registered quantity requirement for that item in the selected order is adjusted accordingly.

It is contemplated that supplies of preprinted labels (e.g. pre-ticketing labels) may be prepared. Devices having supplies of such labels may be selectively activated for labeling packages allocated to respective consignees. However, it is preferred to use commercially available computer-controlled printers for labeling of packages. Labeling may be performed by printing directly on the packages, or on labels to be applied.

The packages are advantageously transported by conveying apparatus past the scanning device to the labeling apparatus. The entire operation is speeded up by employing multiple labeling devices in sequence. Thus, where two labeling devices are used, they may be operated in alternation. During the time interval required for one labeling device to apply a prepared label to a previously scanned package, another labeling device operates to prepare the next label to be applied. In this way the speed of the entire system in processing packages is not limited by the cycle time of a labeling device.

A shipping label may be applied to each package as part of the operation of processing multiple orders concurrently. All the labeled packages may be sorted by the conveyor apparatus in accordance with the consignee-related data. Where a dozen orders of retailers are being processed as a group, the packages bearing a particular consignee's labels are delivered to a packing station or a shipping dock assigned to the related order. It is also feasible to control the conveyor system for sorting packages to be mailed in accordance with postal-zone codes stored in the computer and printed on the shipping labels as part of the order-related data.

With respect to each package allocated to a particular order, the order-processing system includes means for verifying delivery of that package to the delivery site of the conveyor system designated for that order.

Packages allocated to a given order are initially deducted from the quantity requirement of that item registered for that order. That registered quantity requirement is corrected in case of non-delivery or other malfunction of the sorting conveyor. The labeled packages that are not diverted to the designated delivery sites are routed to a reject lane. They can be reintroduced to the scanner after removing the applied labels, or such labeled packages can be delivered to their intended sites manually. If this is done, the computer records may need corresponding revision.

It has been found convenient to use commercial expressions in explaining the invention and its utility. Such expressions are not intended as limiting. The terms "order", "preticketing", "consignee" and "consignee's address" are examples of such expressions. The text of the consignees' addresses normally form part of the controlling computer's stored information forming part of each "order", and the prices used in preticketing may also be part of each stored order. However, the storage representing a selected order may include a "look-up" direction to other storage that actually provides the text to be used. In both cases, the text is related to and determined by the selected order among the group of orders being processed. Moreover, the labeling may well include additional text (such as the date of shipment in legible form or as a bar code) that may not be related to any particular order.

The nature of the invention in its various aspects will be better appreciated, and further objects, novel features and advantages will become apparent, from the following detailed description of an illustrative embodiment of the invention and from the accompanying drawings showing that embodiment.

In the drawings:

FIGS. 2-14 are a composite flow chart for the apparatus of FIG. 1;

FIG. 15 is a diagram representing a modified organization of the computer of FIG. 1;

FIG. 16 is a modification of the flow chart of FIG. 2 to adapt the computer to the data format of FIG. 15; and FIGS. 17A, 17B and 17C are representations of various tach entries of the embodiment of FIGS. 1-14.

DESCRIPTION OF ILLUSTRATIVE EMBODIMENTS

Figure 1:
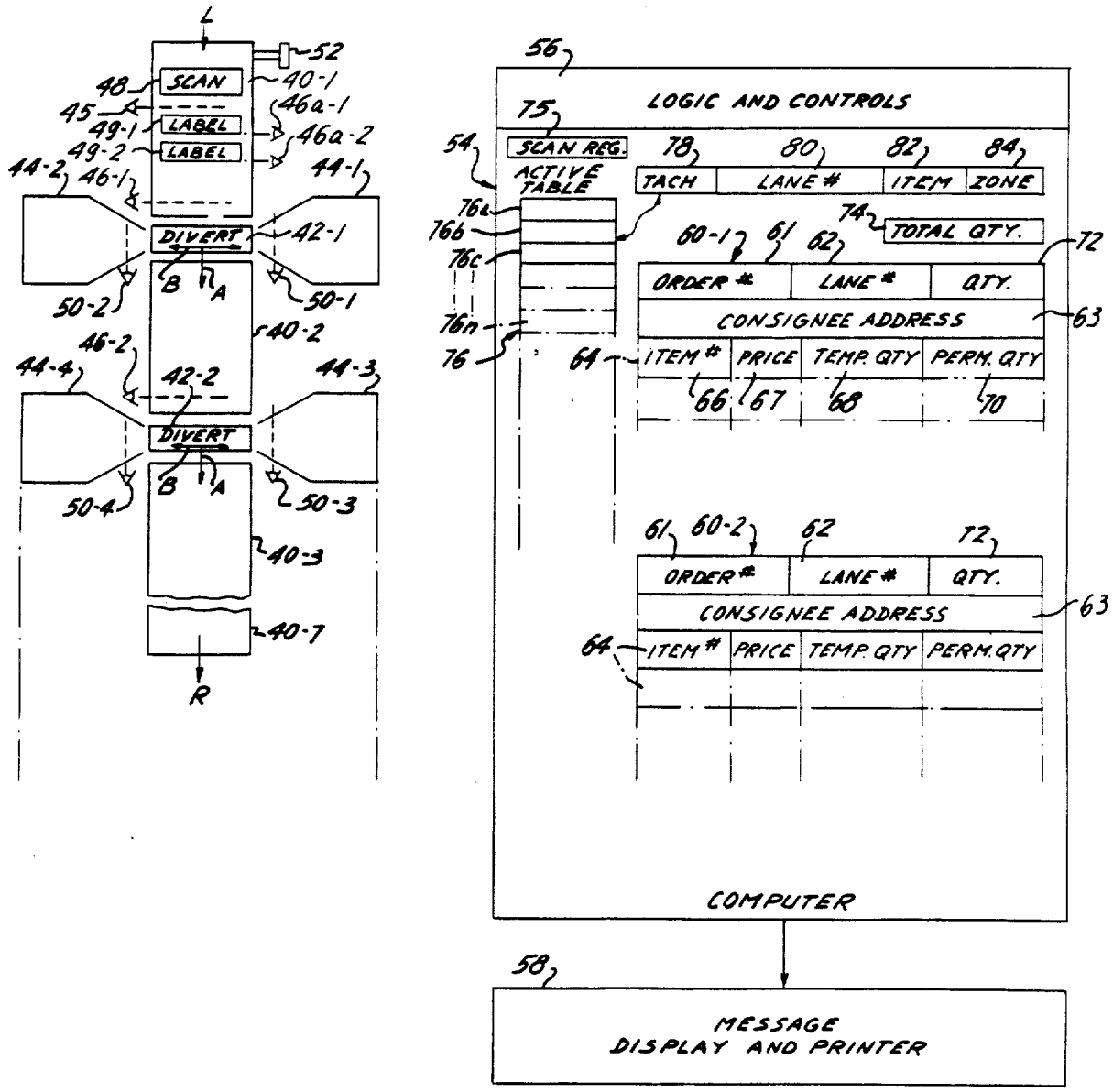
FIG. 1 is a diagrammatic representation of a labeling and sorting apparatus embodying features of the invention.
Figure 1A:
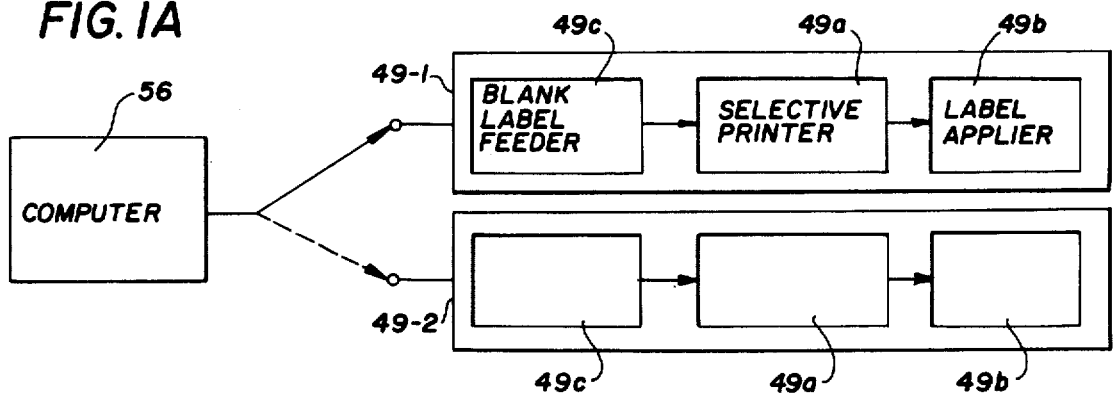
FIG. 1A is a diagram of an illustrative computer-controlled labeler of FIG. 1.

The apparatus detailed below has a conveyor system whose loading end L receives packages of merchandise to be distributed to respective sites that are assigned to the consignees of a group of orders being processed.

In a preparatory routine, a computer is used to accumulate the totals of each of the items needed to fill all of the group of orders being processed concurrently. A list of all such items and their totals is prepared for use as a "pick list". The items are picked from stock and collected for loading in any random order onto loading end L of the conveyor system described below. Picking and transfer of the packages may be done manually or by mechanized apparatus, as may prove expedient. Some items on order might be unavailable. Also, some of the picked items might be picked in error, either because they are not needed for any of the orders or because too many of a given item were picked. Such shortages and picking errors do not interfere with the routine operation of the novel systems in distributing the properly picked items.

The term "package" is used in this specification in a broad sense to signify any entity that is handled separately, such as a box, a bag or a carton, as well as multiple articles secured together as an entity. The term "package" will also serve as an abbreviated reference to an equivalent separately handled entity even if it may not have a wrapping. The sorting conveyor discharges the packages at various "lanes", a term here used interchangeably with the corresponding order-assembly "sites" or "locations".

The apparatus includes label-applying devices that are shown diagrammatically. The label-applying stroke of those devices may be downward, or it may be horizontal for applying a label to a side of a carton. In order to label the successive items properly, the packages should be located on the conveyor consistently, for example centered between the side edges of the conveyor or at a side margin of the conveyor. This can be accomplished by properly placing each item on the conveyor. Alternatively or in addition, means may be provided for biasing each unit into its proper location.

Essentially, the same apparatus may be used for processing small packaged items, small cartons and large bulk-shipping cartons. It may be appropriate to modify the components of the conveyor system in accordance with its use, making them large and rugged for bulk-shipping cartons and of lighter proportions for smaller units. The conveyor system and its timing as described below are appropriate for preticketing in accordance with the designated consignee and routing the packages accordingly. The same program with appropriately adjusted timing can serve for addressing shipping cartons and routing them to respective shipping docks.

Whether the apparatus is used for preticketing or for addressing, the program is essentially the same. In both instances, the labeling is triggered by recognition of what the item is, its characterization and after selection of an order table showing need for that item, the text of the label is derived from the selected order. Notably, recognition of the item at the loading end L of the conveyor triggers a canvassing operation in the computer to allocate that item to a consignee identified with an order table. The text of the applied label is taken from (or derived under control of) the selected order table.

In the embodiment of FIG. 1, a plan view of a sorting conveyor is shown diagrammatically at the left. That apparatus includes plural physically independent belt conveyors 40—each being further identified as 40-1, 40-2, etc. in accordance with its location along the route of package travel from the loading end L and along arrow A. Between each belt conveyor 40 and the next there is an eject mechanism 42, separately designated 42-1, 42-2, etc. in accordance with its location following belt conveyors 40-1, 40-2, etc. A practical form of this eject mechanism is described in detail in U.S. Pat. No. 4,174,774 issued Nov. 20, 1979, the details of which are incorporated herein by reference. Each eject mechanism or diverter 42 includes a series of constantly driven active rollers that tend to advance the packages along the direction of the arrows A from one belt conveyor 40 to the next and, interspaced with such active rollers there are constantly driven belts that run transverse to the conveyor path, along the arrows B. The belts operate in a "normal" direction and they are normally lowered below the level of the active rollers. In that condition of the diverters, the active rollers serve to transport packages along the path of arrows A. With appropriate input control, the eject mechanisms can be raised above the active rollers. They are controlled to operate in their "normal" direction to eject packages to the right, or in the reverse direction to discharge packages to the left. In a practical form of this apparatus, there are six diverters 42, twelve order assembly lanes 44 and seven belt conveyors 40 leading to the reject end R of the travel path.

Adjacent to each diverting device there are two order assembly lanes 44, including order assembly lanes 44-1 and 44-2 for diverter 42-1, order assembly lanes 44-3 and 44-4 for diverter 42-2, etc., for a total of twelve order assembly lanes in this example. Each order assembly lane may, for example, include a discharge ramp sloping to a packing table at a level below the package-supporting level of the diverters.

Entry electric eye 45 is located near the loading end L of the conveyor system. Diverter electric eyes 46 (46-1, 46-2, etc.) are distributed along the package path between the loading end and the reject end R. Immediately ahead of the entry electric eye 45 there is a single item-code reader, especially a laser code scanner 48 which may incorporate its own scan-initiating electric eye. Diverter electric eyes 46-1, 46-2, etc., are located at the ends of the belt conveyors 40-1, 40-2, etc., to detect the arrival of a package to diverters 42-1, 42-2, etc. Electric eyes 46a-1 and 46a-2 detect packages passing control points along belt conveyor 40-1.

Two printing and label-applying devices 49-1 and 49-2 controlled by electric eyes 46-1 and 46-2 are located along belt conveyor 40-1 between scanner 48 and the first diverter 42-1. In the illustrative apparatus, each of these devices 49-1 and 49-2 includes a computer-controlled printer 49a that prints data on a label and that includes means 49b for applying the label to a package. For example, the labels may be the pressure-sensitive adhesive type. They are supplied by a feeder 49c to the printer one-at-a-time, as from a roll of release-coated carrier strip, by means of a customary feeding mechanism. Each printing and labeling device in this example includes a vacuum label-applying head that grasps each newly printed label, plus means for peeling away the carrier strip as the label is grasped. The vacuum head then applies the label to a package. Details of these devices 49-1 and 49-2 do not form part of the invention and are not illustrated. Indeed, it is within present contemplation to perform the labeling operation by directly printing data on each package.

"Acknowledgement" electric eyes 50 (50-1, 50-2, etc.) are arranged partway along the order assembly lanes 44-1, 44-2, etc.

All of the belt conveyors 40 are alike, except that they may differ in path length as may be expedient in a given installation, and their electric drive motors are alike. The diverters are also alike and their motors are alike. All the motors are turned on and off in unison, and they are supplied by a common electric power line. Accordingly, the belt conveyors tend to transport packages at the same speed, which speed may vary with line voltage and with wear (unless synchronous motors are used). Some packages may move in near-synchronism with the belts while others develop a certain amount of "slip", the difference between the belt speed and the actual package speed. The package-forwarding speeds of the diverters are also alike, and they are similarly subject to "slip". The package forwarding speed of the diverters equals that of the belt conveyors and, in an example, the diverter belts move thirty percent faster. The whole system is easily installed and accommodates a wide range of package shapes, proportions and weights. Belt conveyors are inexpensive, widely available and relatively trouble-free.

One of the belt conveyors 40-1 has a "tach" (tachometer) pulse generator 52 connected to its drive mechanism, producing a train of pulses representing the belt drive and closely representing the belt speed. The tach pulses also approximate closely the speed of all other belt conveyors 40 and of the forward-feed rollers of the diverters. As will be seen, the tach pulses are part of a system that enables packages downstream of the single scan unit to be treated dependably as the packages that were scanned earlier, despite a range of "slip" and "non-slip" conditions. As is apparent, the tach pulses stop when the conveyor system is at rest.

Computer 54 with its logic and control apparatus 56 responds to the conveyor system and to manual control, and it controls the selective delivery of merchandise loaded onto the first belt conveyor 40-1; and the computer operates message output apparatus 58 (representing CRT displays and printers as well as any requisite off-line computers and printers) for issuing reports, for producing shipping papers, and for related accounting purposes.

Computer 54 as represented in FIG. 1 is organized to have a number of order tables 60 (designated 60-1, 60-2, etc.) including one such table for each order assembly lane 50. Each table has a register 61 for an order number and a register 62 for a lane number, and (where the apparatus is to apply address labels) it includes storage 63 for the name and address of the consignee. Each order table also includes as many item entry positions 64 as there are items in that order. Each item entry position has an item number register 66, an item price register 67, a temporary quantity counter 68 and a permanent quantity register 70. Additionally the computer has a quantity counter 72 for each order table, and a quantity counter 74 for the grand total of all the items of all the orders being processed together. Register 75 may store outputs of scanner 48. The "product characterizations" provided by scanner 48 and the "item characterizations" in registers 66 both signify the same items in the orders.

The computer additionally includes an active table 76 providing as many positions 76a, 76b, etc. as there are packages on the conveyor system 40-1 to 40-6. The table position representing a typical package is designated "76n". Each table position includes a tachometer ("tach") register 78, an order assembly lane register 80, an item identification register 82, and zone register 84. The code number here represents a package containing one unit of a particular product. The "unit" may be a single product or multiples of a certain product, and each order then lists the quantity of each product in terms of single products, dozen-product packages, etc. This example could be changed readily to accommodate packages of various numbers of units by adding a number-of-units scanner to the item-code scanner, plus corresponding arithmetic provisions in the computer.

For example, conveyor 40-1 is to be loaded with up to three packages between the entry eye 45 and the first diverter electric eye 46-1. This package density normally provides a safe allowance for tracking packages of widely different lengths and weights traveling between entry eye 45 and diverter electric eye 46-1, and it promotes dependable ejection of one package before the next package is conveyed onto a diverter. It is of course possible that packages might be jostled or slip so far out of position along the conveyor as to jeopardize tracking by means of the system described below. If such a condition should occur, an automatic alarm develops in the apparatus of FIGS. 1–14 to signal faulty operation or risk faulty operation.

In a contemplated form of the novel apparatus, the alarm condition can be set up to half the conveyor for allowing an attendant to locate and correct the cause of the alarm, and then the system could be returned to its order-assembling routine. In a further specific aspect of the invention, the "alarm" may be followed by a "flush" operation of the conveyor system, in which the diverters are disabled and the packages are all discharged at the reject end R of the conveyor. When packages pass the scanner, the temporary quantity registers for the various items in the order tables are all reduced. However, the packages on the conveyor might not be diverted to their designated lanes. Surely "flushed" packages do not reach their intended order assembly lanes. The novel apparatus includes a safeguard against this erroneous condition. The apparatus includes means for correcting the temporary item quantity counters in the order tables for each of the items present on the conveyor system but not diverted to their designated order assembly lanes, not only in the course of a "flush" operation but if for any reason a second package is not delivered at its designated order-assembly lane. After "flush" of the conveyor, processing of the group of orders can be resumed just as if the mishap had not occurred.

The number of package-representing positions available for active table 76 should at least equal the maximum number of packages on the conveyor system from eye 45 to eye 46-6. In an example, three packages can be loaded on the first conveyor 40-1 between eye 45 and eye 46-1, and five packages may be a safe maximum along the longer segments from each eye 46 to the next. This maximum loading of the conveyor is adopted as a safe example for the package-tracking system described below and for assurance that any one package can be moved onto a diverter and ejected before the next package reaches the diverter, risking unintended ejection. With this assumption, the active table used in tracking packages for selective ejection should provide at least twenty eight (28) package-representing positions 76. The loading density can be increased with experience, and in any case more small packages than large ones can be loaded safely, correspondingly utilize more of the active table positions.

Counter 78 is "initialized" (gets an initial entry) at each eye 45 and 46-1 . . . 46-5. These entries are routinely decremented as the conveyors move, in time with the tach pulses, by computation means in the computer. The lane number is entered into register 80, being the same as the number in register 62 of an order table 60, identifying an order assembly site 44. The item code is entered at register 82. Finally, a number is entered into register 84 corresponding to each segment of the package path. Here, for example, 1 is entered in register 84 as a package passes eye 45, changed to 2, 3, . . . 6 as a package passes eyes 46-1, 46-2, etc., to identify the zones along the conveyor approaching the respective eyes 46-2, 3, etc.

It may be assumed in an example that three spaced-apart packages may be carried safely by conveyor 40-1, and that five packages may be distributed between each eye 46 and the next. This includes the "slip" allowance and an allowance for the times needed to divert packages of various lengths. As further detail in this example, a conveyor-advance interval of 127 tach pulses has been adopted for the package-travel segment from entry eye 45 to diverter eye 46-1, and an interval of 205 pulses has been adopted for each segment from any diverter eye 46 to the next. These tach pulse intervals are subjected to an allowance for slip, being plus or minus 19 pulses in this example. Thus, for the first segment from eye 45 to eye 46-1, the minimum interval is 108 pulses and the maximum is 146 pulses, and the intervals for the next segments marked by successive eyes 46 are a minimum of 186 pulses and a maximum of 224 pulses. These tach-pulse intervals are subject to change, based on experience. If computer speed is limited, the numbers in the foregoing example may be judiciously reduced by a factor of 2, 3 or even 6, correspondingly reducing the tach pulse frequency.

When an item is detected by eye 45, the number 108 is entered in register 78. The tach pulses decrement this number progressively to zero by the time a package reaches eye 46-1 without slip. If a package should arrive at eye 46-1 when this register has any reading above zero, the package arrived too soon, tracking is doubtful, resulting in ALARM. If register 78 reads 0 to −38 (inclusive) the package arrival is timely. In this example, if the register reads −39, the slip is regarded excessive, there being doubt as to proper tracking. Whenever any register 78 drops to −39, the system goes into ALARM (FIG. 17).

When a package is to be ejected by any of the second through the sixth diverters, register 78 of that package's active table position is initialized at 187 as it is detected by each eye 46-1, 46-2, etc. adjacent the preceding diverter. The amount in the related register 78 (the tach register in the active table position 76n representing that package) is decremented by the computer in response to tach pulses as the package is transported from each travel detector eye to the next. For fastest transport, this register should read zero when the package reaches eye 46-2. As noted above, register 78 can read from 0 to −38 if it arrives at any eye 46 within a "window" of allowable slip, but a positive number causes system ALARM; and −39 at any time causes ALARM.

The tracking system avoids cumulative slip—accumulating the slips that may occur along the successive travel segments. Those "slips" are erased as a package starts along each new travel segment, its related tach register 78 being initialized anew, regardless of the slip that occurred (within the allowable limit) along the preceding travel segment.

In this example, the travel intervals of a package that are provided before each register 78 is initialized correspond to the distances to each of the diverters. The slip that occurs in each travel interval is erased, in effect, if it is within allowable limits. If appropriate, there could be two "slip" checks between each diverter and the next. This can be visualized by retaining eyes 45 and 46-1 through 46-6 in a systen that has but three diverters 42-2, 42-4 and 42-6. Separate sets of detectors could be used to monitor "slip" and to control the diverters, but here eyes 46 serve the dual purposes of the "slip" check and activation of a selected diverter under computer control.

Tracking of a package is performed here by checking all the active table entries of a zone as identified in register 84 to locate the one whose tach count is 0 to −38, i.e., not more than 0. (It cannot be less than −38.) That active table position is checked to see whether the package that was detected by that eye is to be diverted. If not, the zone register is incremented to be correlated with eye 46 of the next zone, etc. The package is thus identified only as the package that must be there at a given time in tach pulse counts after having been scanned initially or transferred past a previous diverter. That kind of identification has been vindicated by correct assembly of a vast number of orders using the described apparatus.

Immediately after a package is scanned, the computer performs a routine that determines the allocation of the scanned package to an order which "needs" that item. Data is taken from the related order table in the computer (the consignee's address or preticketing price, or both if desired) and supplied to one of the printing and labeling devices 49-1 or 49-2. Printing of the labels occurs while the related packages are advancing.

In the first mode of operation according to the routine described in detail below, each labeling device applies a label to one package and the other labeling device applies a label to the next package. (Three labeling devices may be provided if justified, arranged to operate in sequence.) While each labeling device is in the label-applying portion of its operating cycle, the other labeling device is printing a label to be applied subsequently. This sequence has the advantge of providing for the cycle time interval of a labeling device without forcing a corresponding slow-down of the conveyor system.

Eyes 46a-1 and 46a-2 and the labelling devices 49-1 and 49-2 controlled by those eyes are at empirically determined positions close to scanner 48. As one package passes scanning device 48, it triggers a computer-controlled printing operation in one of the labeling devices. At that moment, a previously printed label is available in the other labeling device, ready to be applied to the previously scanned package. That package is in transit on belt conveyor 40-1, and it passes both of the labeling devices and their respective control eyes 46a-1 and 46a-2. That previously printed label is applied to the package for which it is intended when the related labeling device is activated by its control eye. The same package passes the control eye of the other labeling device, but the label-applying portion of that other labeling device does not respond.

The flow charts of FIGS. 2–14 represent the operation and certain internal capabilities of the apparatus of FIG. 1. It is presumed that, at the outset, the data for a group of orders (up to twelve orders in this example) has been entered into order tables 60 and counter 74. Entering this data can be done manually or from off-line equipment. It is also presumed that packages bearing machine-readable product-identifying codes are loaded successively onto conveyor 40-1, suitably spaced apart. The packages may be loaded manually or routed by conveyors from diverse item-storage bins.

After activation of the "Start" block (FIG. 2), "Wait" block a′2 is in condition to receive interrupts. In case a new interrupt is received while a previous interrupt is being processed, the interrupts are stored and used in sequence or on a priority basis, in accordance with usual programming techniques. An interrupt at block a′3 may be a manual interrupt such as a report request or a conveyor restart directive, or the interrupt may signal breaking of eye 45, 46, 46a-1, 46a-2 or 50, or the interrupt may be a "Scan" signifying that an item code has been received by the computer from scanner 48 or is present in register 75. The electric eyes are in conventional circuits designed to produce a momentary impulse of one polarity when an eye goes from "light" to "dark", with a resulting interrupt to the computer. Opposite-polarity impulses which may occur when the eye goes from dark to light can be utilized separately or they may be suppressed. In such a circuit, the eyes do not produce "light-to-dark" impulses during protracted dark intervals such as would occur here in case two or more packages are bunched together, not allowing light to reach the eye between the packages. These impulses enter the computer separately and are stored, until used, as identifying codes for the eyes.

Decision block a′4 tests whether the interrupt is "manual". During routine order-assembling operations, the interrupt is not "manual", so the interrupt drops to block a′5 which determines whether the interrupt is from one of many electric eyes in FIG. 1.

The interrupt at block a′3 may be neither a manual interrupt nor an "eye" interrupt. Therefore, it is a "scan" interrupt and it drops to decision block a′6 to test whether the scan represents a proper item code using a routine type of validity check. If the code is valid, the interrupt drops block a′7, to enter the item number in register 82 of the next available position of active table 76. If it is not a valid item code, the interrupt drops to block a′6a to convert the invalid item code to a reject-code symbol such as "99999" which, when the interrupt drops to block a′7, is entered in item register 82 of the next active table position. This package becomes identified with this active table position "76n" during the continuing travel of this package.

The scan interrupt drops to decision block a′8. This block represents a multiple-comparison routine to determine whether the scanned item code matches an item code 66 in any of the sequentially tested order tables 60, and if the item number is present in any tested order table, to determine whether the amount in the related temporary register 68 is greater than "0". If this determination is negative for all the order tables, it signifies a package having been loaded onto the conveyor that is not needed. In that event, the interrupt drops to a block a'9 to set a "reject" symbol, e.g. "99", in lane register 80 of the active table position 76n containing the new item entry in register 82. The result is that this package will not be ejected at any order assembly lane but will be delivered to the reject end R of the conveyor system.

If the determination in block a'8 is positive, the interrupt drops to block a'10 directing entry of a lane number in register 80 of the related active table position 76n, the same as the lane number in register 62 of the first order table 60 that was found needing the item. For any one lane, registers 62 and 80 contain the same code, a code that includes the code of the diverter eye 46 and adds a right-or-left bit. Otherwise, each diverter-control eye 46 may be represented by two codes, one for the right lane and one for the left, and then the same codes would identify registers 62 and 80 and an eye 46. The interrupt then drops to blocks a'11a and a'11b to decrement the quantity in temporary register 68 and in order-total register 72 of the corresponding order table 60n, continuing at connection C of FIG. 3.

Figure 2:
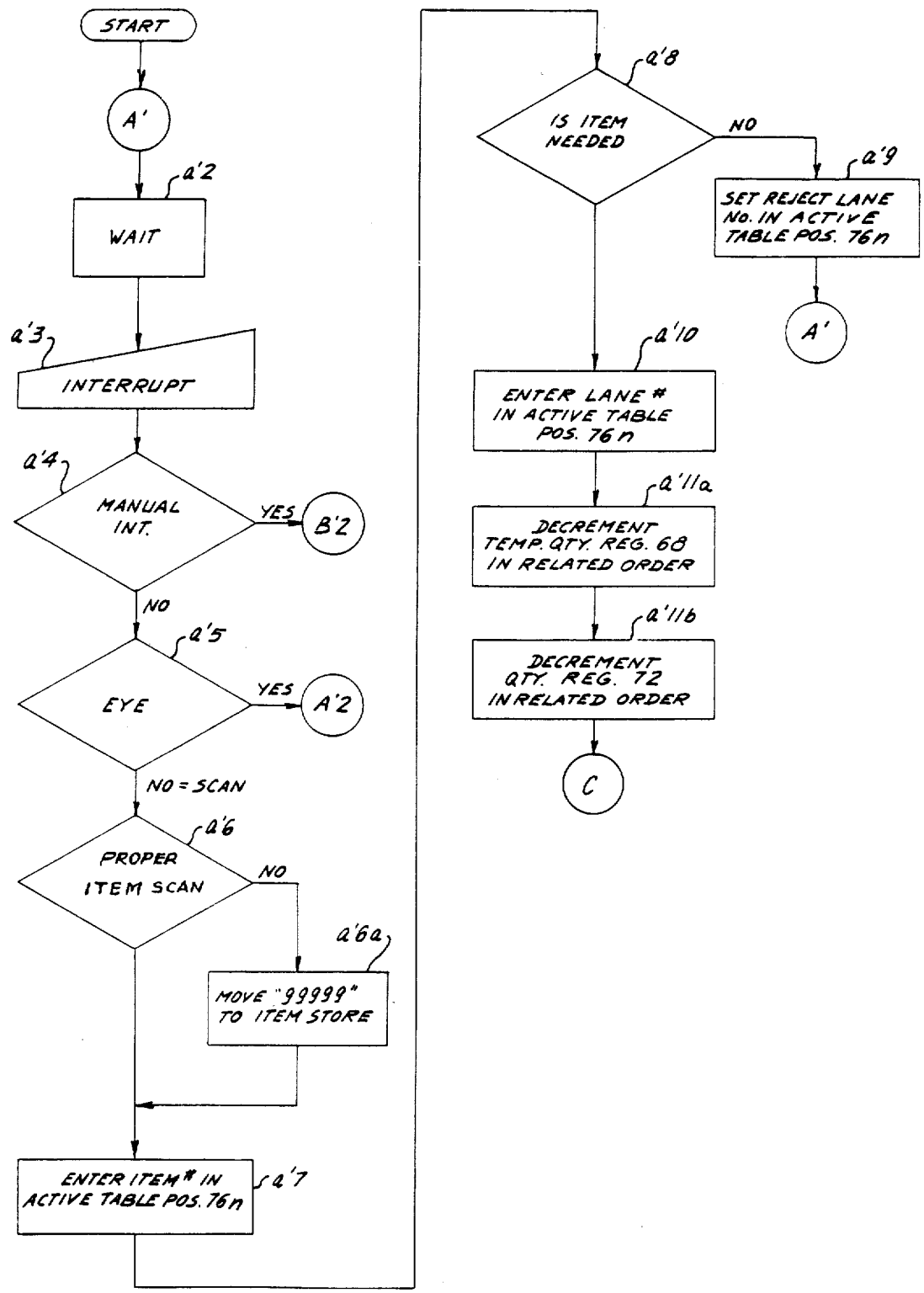
Figure 3:
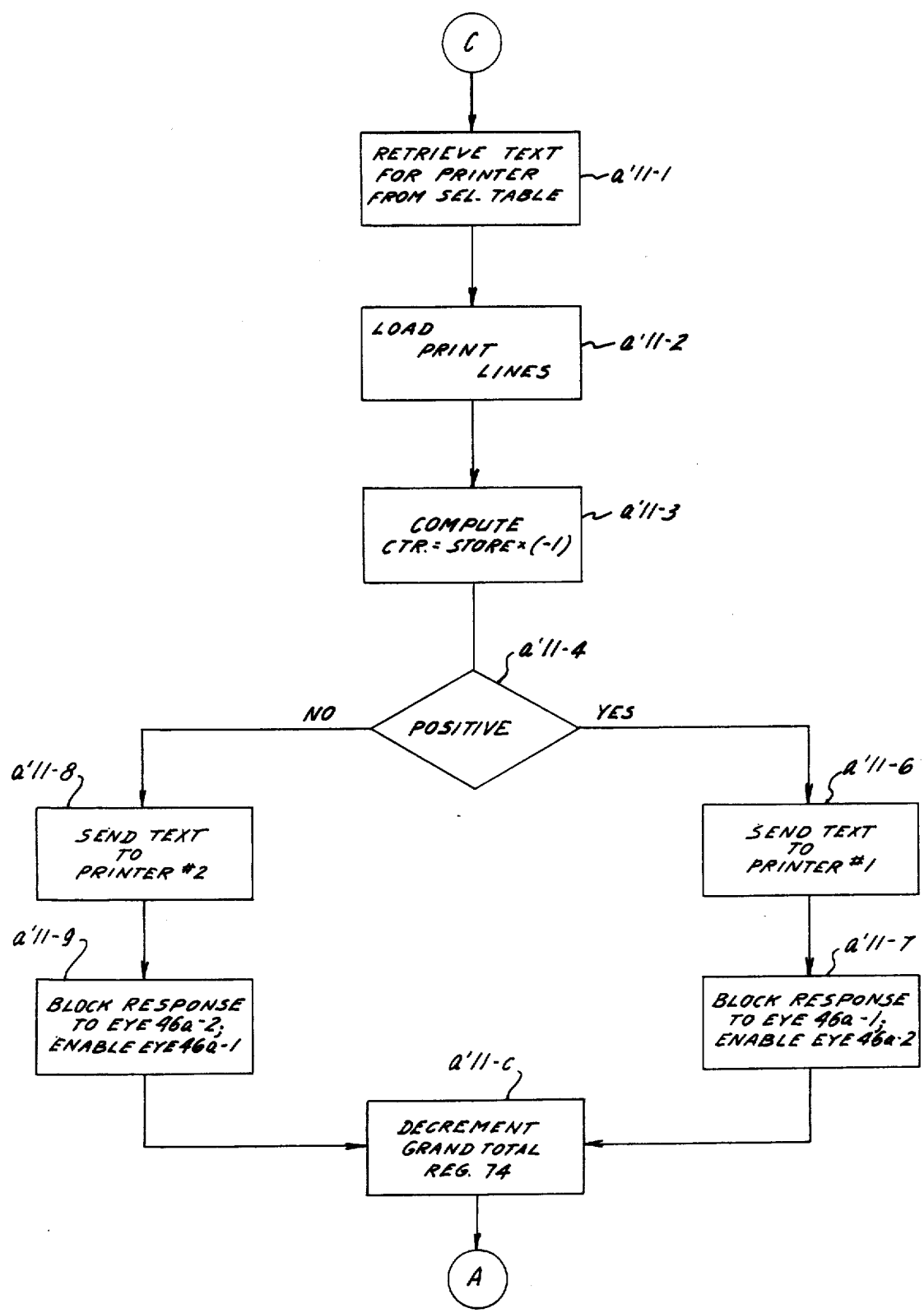
Figure 7:
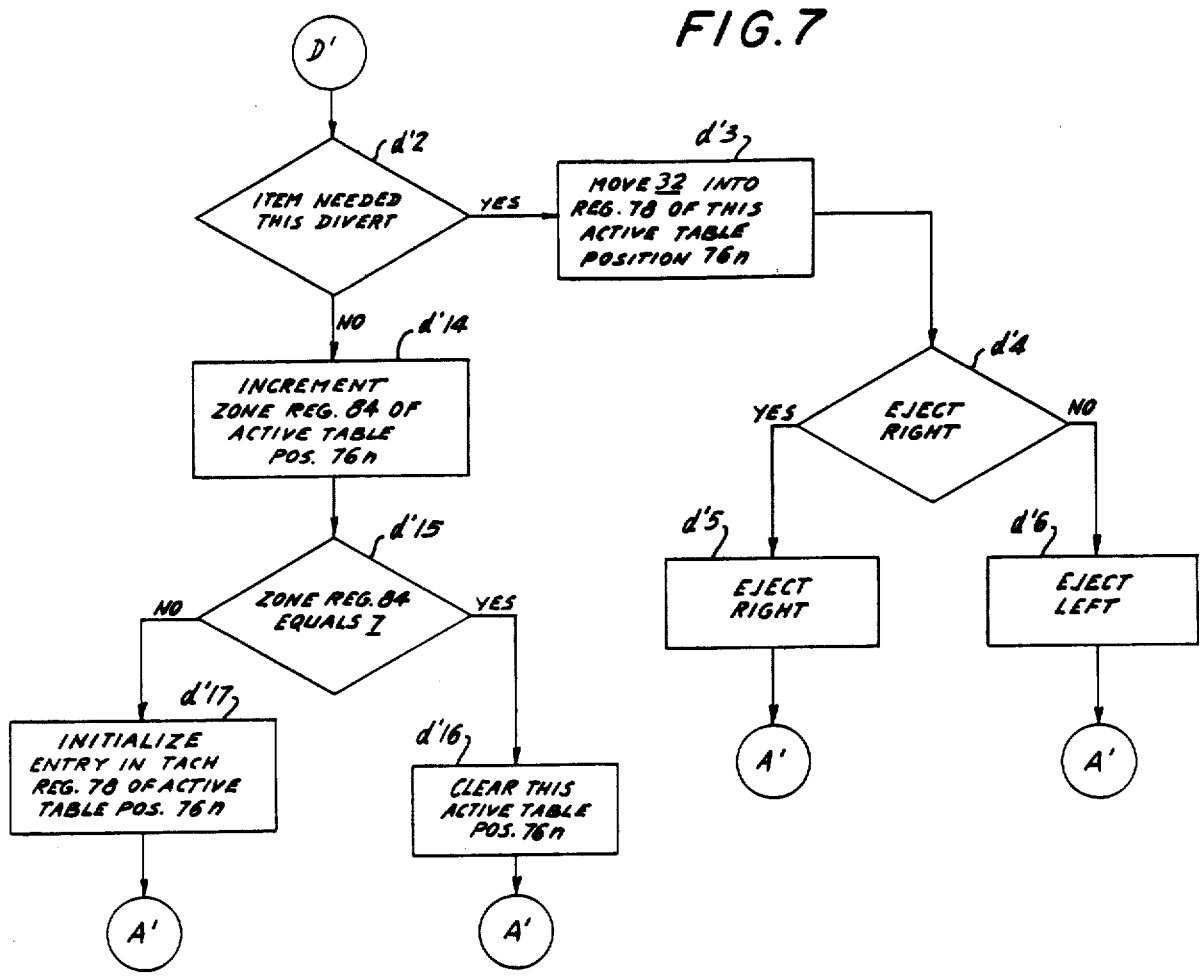

When a scanned item is recognized as being needed and is designated for a selected order table 60n, the program of FIG. 2 continues via connection C as represented in FIG. 3. Text is retrieved (block a'11-1) from the appropriate part of the selected order table 60n, being price register 67 where the apparatus is being used for preticketing. As an alternative, the preticketing price could be derived by a separate subroutine (not shown) in which an item-price schedule is stored for each consignee. Then the printed price would be determined jointly by the lane (consignee) register 62 and the item register 66. If the apparatus were being used for printing and applying address labels to shipping cartons, the text would be retrieved from address storage 63 of the selected order 60n.

The interrupt drops to block a'11-2 to load the retrieved text into print lines in the computer. The interrupt to block a'11-3 is provided for causing labeling devices 49-1 and 49-2 to operate in alternation. A store in the computer acts as a flip-flop and represents numerically the last-selected labeling device 49-1 or 49-2. The store is either "1" or "−1". In block a'11-3 it is multiplied by "−1", so as to become negative if it had been "1" and to become positive if it had been "−1". The interrupt to decision block a'11-4 causes the text in the computer's print lines to be transferred to the printer of labeling device 49-1 if the flip-flop store is positive (block a'11-6). At block a'11-7, a control is stored that renders the label-applying portion of the labeling device 49-1 non-responsive to eye 46a-1 and restores eye 46a-2 into control of the label-applying portion of labeling device 49-2. If the decision is negative, the interrupt from decision block a'11-4 drops to blocks a'11-8 and a'11-9 for correspondingly transferring the data from the computer's print lines to the printer of labeling device 49-2. Eye 46a-1 is restored to control of the label-applying portion of the labeling device 49-1. The label-applying portion of labeling device 49-2 is rendered non-responsive to its control eye 46a-2. The interrupt from block a'11-7 or a'11-9 drops to block a'11c to cause decrementing of the grand total register 74 of the related order and the program returns to connection A'.

The just-scanned package then breaks entry eye 45. This is an "eye" interrupt which drops via decision block a'5 and connection A'2 to decision block a'12 (FIG. 4), to determine whether the interrupt is due to entry eye 45 or another eye. If it signifies "breaking" of the entry eye, decision block a'13 determines whether the related active table position 76n contains an entry in its register 80. If not, the interrupt to block a'13a causes a reject code, e.g. "99" to be entered in lane register 80; and for either decision in block a'13, the interrupt then drops to block a'14. This block a'14 causes entries to be made in tach counter 78 and zone store or register 84 of the related active table position 76n. In this example, counter 78 is "initialized" by entering 108, and 1 is entered into register 84. The program then returns to connector A' to await the next interrupt.

At this point, the programming has scanned the item code of a package and recognized the package at entry eye 45; and data was entered into the active table position 76n representing a package at the entry eye, being carried on belt conveyor 40-1 toward labeling devices 49-1 and 49-2 and toward diverter eye 46-1.

The interrupt at block a'3 may be an eye interrupt from eye 46a-1 or 46a-2 at the labeling devices. If so, the interrupt drops via connection C'1 or C'2 (FIG. 5 or 6) to block c'1 or c'3 to execute a test of whether control was stored (block a'11-7 and a'11-9, FIG. 3) enabling the label-applying protion of one of the labeling devices 49-1 or 49-2 to respond to its related eye 46a-1 or 46a-2. Each package that triggered a label-printing operation in one labeling device should not activate the label-applying stroke of the other labeling device. If labeling device 49-2 is to apply a label, labeling device 49-1 would not respond to a package passing eye 46a-1 because the test would show that only eye 46a-1 is effective. If labeling device 49-1 is to apply a label, labelling device 49-2 would not respond to a package passing eye 46a-2 because the test would show that only eye 46a-1 is effective. Accordingly, an interrupt reaches block c'2 or c'4 to initiate a label applying operation only when the right eye 46a-1 or 46a-2 is broken by a package that is to be labeled.

The interrupt at block a'3 may be an "eye" interrupt from any of the six eyes 46 that detect a package traveling along the conveyor system. That interrupt drops to block a'5 and via connection A'2 to block a'16 (FIG. 4). This block represents a chain of decision blocks that determine the address of the particular eye 46 that is responsible for the interrupt among the six diverter eyes 46-1, 46-2, etc.

As a typical case, let it be assumed that eye 46-1 is responsible for the interrupt. If so, when the address of eye 46-1 is located, up to three active table positions 76 are coordinately identified (block a'17) having "1" in their registers 84. (No more than three packages may be loaded onto belt conveyor 40-1 in this example.) Those zone-1 active table positions are tested (block a'18) to determine the number then entered in their tach counters 78.

It was mentioned above that each initialized tach register 78 is decremented in response to each tach pulse from generator 52. This occurs in an independent, priority, free-running program shown in FIG. 14. Its cycle is initiated by tach-pulse interrupts from generator 52 at connection X—X. These interrupts to block x'1 decrement the tach registers 78 in each of the active table position 76 that contain entries. The interrupt drops to decision block x'2 to test each decremented register as to whether −39 has been reached, then to block x'3. The decrementing of successive tach registers 78 and tests for −39 continue until all entry-containing positions in active table 76 have been processed, the routine that was initialed by any one tach pulse coming to STOP. However, if any −39 entry should appear, the interrupt shifts to "Output Message" block x'4 and the entire system goes into ALARM.

Count-down to −39 shows that the maximum allowed number of tach pulses was exceeded. It may be due to several causes. A package may be delayed excessively because of an odd characteristic that causes more than the allowed "slip". An excessive time interval may also elapse after a package leaves one eye and before the next eye is broken if a package falls off the conveyor or if the package path is obstructed or if a belt conveyor is arrested or becomes abnormally slow. Where photoelectric eyes are the form of detector used, a condition arises which simulates excess travel time, where two packages are spaced apart upon leaving one eye and where they shift against each other before reaching the next eye. In that condition, the second eye 46 does not normally recognize the arrival of the second package.

(As an alternative to the routine of testing each register 78 each time it is decremented, it would be feasible to delay the tests for −39 until a package is detected by the next-following eye 46. However, this alternative would not respond to some of the abnormal package-transporting conditions mentioned above.)

Assuming no excess travel-time condition exists, the routine of FIG. 14 stops, awaiting the next tach pulse. The routines executed in response to interrupts at connection A' are executed in the intervals between the cyclic priority routine of FIG. 14.

So long as there is no ALARM, it follows that there are no positions in the active table 76 having counts less than −38 in their registers 78.

The interrupt initiated by eye 46-1 drops to decision block a'18 to determine whether any zone-1 tach register 78 contains less than +1, i.e., 0 to −38. There can only be one zone-1 active table position 76n that yields a "yes" result. The interrupt drops to block a'19 to find the address of that zone-1 active table position 76n and to decision block d'2 (FIG. 7) via connection D'.

Block d'2 compares the code of eye 46-1 with the corresponding portion of the code in register 80 of the active table position 76n, i.e. the position containing both a "1" zone entry and a tach entry of 0 to −38. The package responsible for this eye 46-1 interrupt may be needed at order assembly lane 44-1 or 44-2, or it may not be needed at either lane.

If a package is needed, its divert travel-time may be monitored by a suitable timer. A distinctive form of timer is provided here. For this purpose, the interrupt to block d'3 causes +32 (for example) to be moved into register 78 in active table position 76n related to this package. This entry into register 78 starts a new timing interval, stripped of variables occurring along the forward-travel path A, for diverter 42-1 to transport a package to acknowledgement eye 50-1 or 50-2. In an example, a 70-pulse interval was found appropriate. This interval includes an allowance for the minimum travel time and for maximum travel time along a divert path B, for "slip" due to various causes, etc. If a package is unduly delayed, the identity of the package could be in doubt. Starting with +32, register 78 related to an excessively delayed package is decremented by tach pulses beyond the allowed 70 pulses to −39, and (FIG. 17) the system goes into ALARM.

Normally the interrupt drops from block d'3 to block d'4 for a "right" or "left" divert selection in dependence on the lane code in register 80 of the related table position 76n. The interrupt drops to block d'5 or d'6 for activating the diverter in the selected direction, the program returning to connection A'. The package presumably is diverted to lane or site 44-1 or 44-2.

Figure 8:
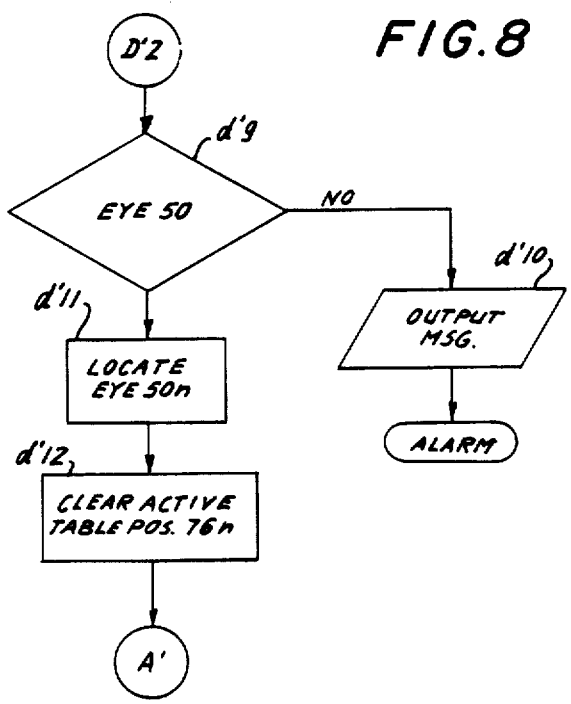
Figure 9:
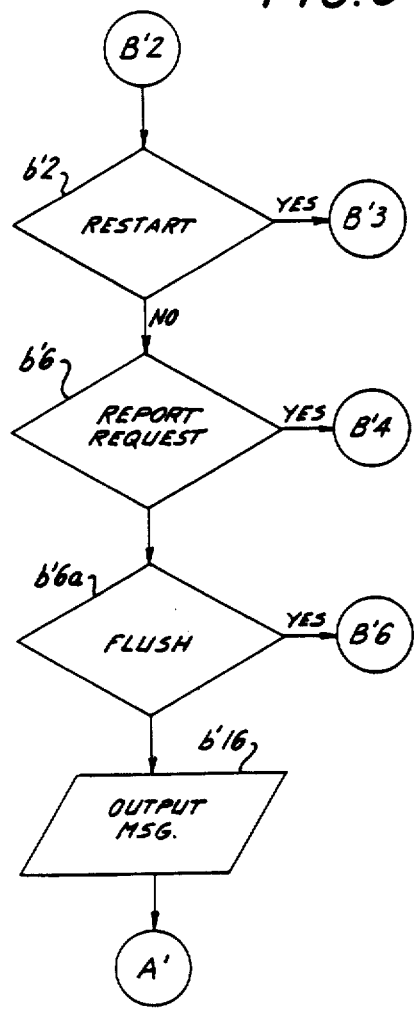
Figure 10:
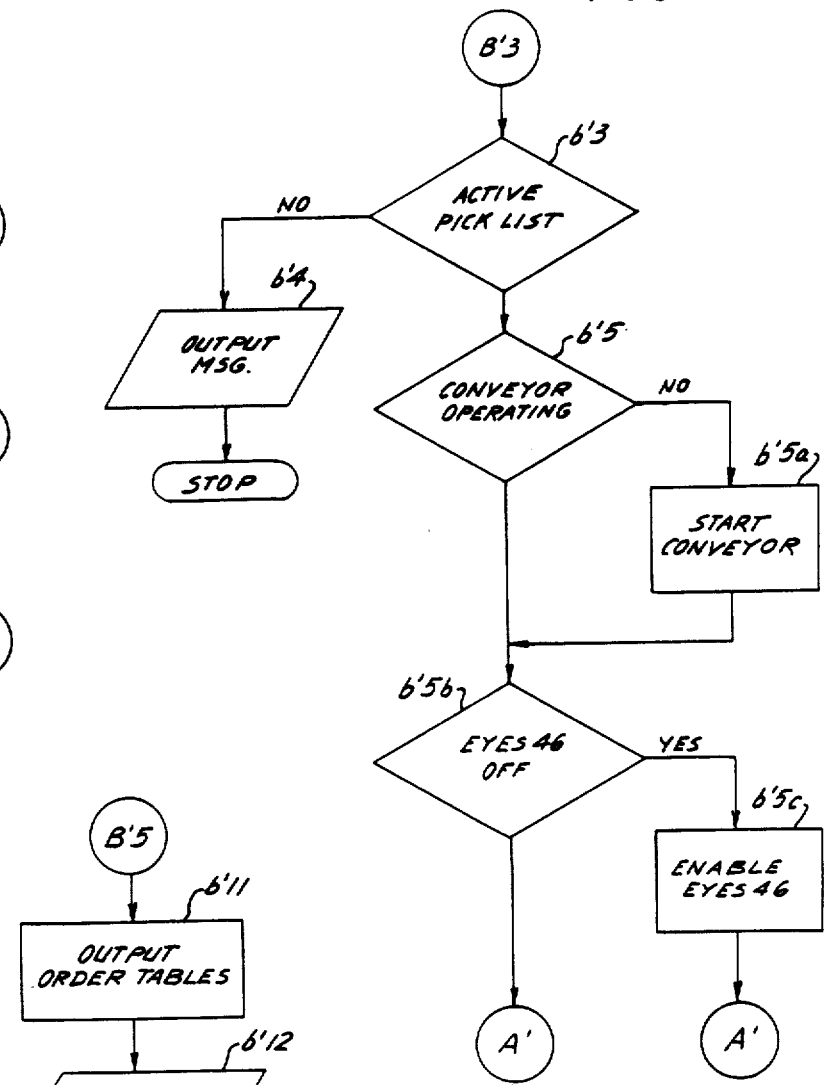
Figure 11:
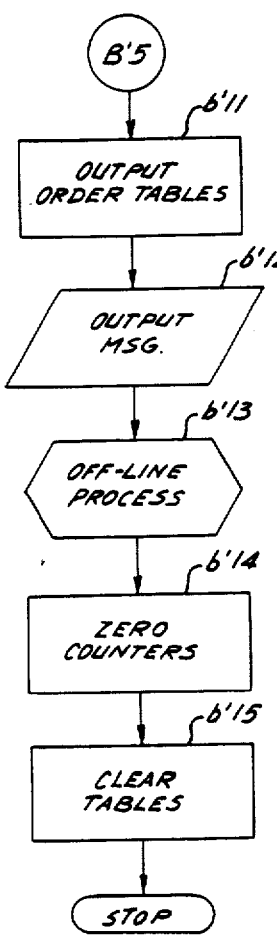

Returning to FIGS. 2, 3, and 4, if an interrupt is an eye interrupt and if it is neither an eye 45- nor an eye 46-interrupt (the codes of eyes 46 and 50 having distinguishing bits), the interrupt from decision block a'15 drops to decision block d'9 via connection D'2 (FIG. 8). A spurious interrupt drops to block d'10 and to ALARM. An eye 50 interrupt drops to block d'11 to locate the address of eye 50-1 or 50-2 (in this example) by comparing its code with the entire code in lane register 80 of the active table position 76n related to the package being tracked. That the program continues in operation signifies on-time delivery of the package to acknowledgement eye 50; otherwise the tach register 78 in its divert-timer role would have been decremented to −39 stopping the belt conveyors, the diverters and the tach generator. Accordingly, the package responsible for breaking the related eye 50 has been verified as having been delivered timely to its assigned order assembly site 44. The interrupt drops to block d'12 to reset the active table position 76n related to this package, the data being no longer needed.

In case the delivery of a package is not acknowledged by the related eye 50, the ALARM condition resulting from a tach register 78 dropping to −39 would not result in resetting of the active table position related to any package which did not reach its eye 50, whether it was unsuccessfully diverted or it was prevented (as by package back-up) from reaching an eye 50. For all such undelivered packages, entries in the related active table positions are available. Notably the item number in each register 82 and the lane number in each register 80 are to be used subsequently (FIG. 13, discussed below) to increment counter 72 of the related order table 60 and to increment the temporary counter 68 for that item in that order. This operation corrects for the deductions that were made from those order registers when the package was first scanned.

The item numbers in the active table positions are not part of the package tracking system. In the described apparatus, tracking of a package depends on its timing, from its entry at eye 45 to its timely arrival at each eye 46 and at eye 50 of its designated delivery lanes 44.

As part of the resetting of an active table position 76n, its tach register 78 is reset. Thus, each tach register 78 serves as part of a timer started by an eye 46 and prevented from timing-out by a related eye 50 and resetting of register 78. This is a role of tach register 78 additional to its function in monitoring package speed along segments of the conveyor system. The timing interval ends with reset of this register 78. Due to ordinary program techniques, after any entire position in the active table has been reset, its tach register 78 is not responsive to the tach-pulse decrementing routine of FIG. 14.

The apparatus as thus far described provides a "window" allowing for a range of "slip" of package on a belt conveyor or on a segment of the system comprising the forward-feeding rollers of a diverter plus the next-following belt conveyor, and the apparatus provides separately for diverter travel time including provision for a latitude of variation in the time needed for packages reaching an eye 46 to travel to a related eye 50.

Where a small computer is to be used and its capacity is limited, various changes may prove advantageous. Thus, omitting the separate diverter timing feature may be an acceptable modification. The timing examples above may be used in one such modification, i.e. 108 tach pulses as the minimum non-slip travel time of a package from entry eye 45 to diverter eye 46-1, plus an allowance of thirty eight tach pulses for "slip", and a range of additional tach pulses as the maximum needed for a diverter to transport a package from the diverter eye 46 to a related eye 50. Using the conveyors and diverters as in FIG. 1, the modified system can be made to work dependably, without providing separately for timing of package travel in the diverters, simply by allocating more space along the conveyor to each package, or by reducing allowances for slip and diverter time as may be justified by experience.

Referring again to the form of apparatus shown in FIGS. 1-14, it is conceivable that a package may arrive at an eye 46, e.g. eye 46-1 at the end of zone "1", yet there is no active table position whose tach register 78 reads less than "1". This signifies premature arrival of a package at a diverter eye, and its tracking is in doubt. The interrupt at block a'18 (FIG. 4) drops to block a'20 to produce an output message, and to ALARM.

It may be determined that a package that activated diverter eye 46-1 was in fact a timely package (block a'18) and its active table position 76n shows at register 84 that it is a package on conveyor 40-1 (zone 1), but a check of its register 80 (block d'2, FIG. 7) shows that it is not needed at either order assembly lane 44-1 or 44-2. The interrupt drops to block d'14 causing zone register 84 in this active table position 76n to be incremented to "2". Since zone register 84 does not equal "7", the interrupt to decision block d'15 drops to block d'17, causing tach register 78 to be initialized, i.e. set at 186. In this example, there are 186 tach pulses during non-slip travel of a package through each of the next conveyor segments, from each divert eye 46 to the next divert eye. Then the program returns to connection A'.

This package is transported by the active rollers of diverter 42-1 to belt conveyor 40-2 and to divert eye 46-2. Exactly the same programming applies to the package on the second conveyor 40-2 and travel eye 46-2 as was described above for a package on conveyor 40-1. If the package is not needed for lane 44-3 or 44-4, the package is transported to conveyor 40-3 by the active rollers of diverter 42-2; and the same program is executed for this package for the successive conveyors and diverters so long as it is not needed. Each time a package is not needed at any diverter 42, and so long as the entry in zone register 84 of the active table position 76n identified with this package is less than "7", zone register 84 for the active table position 76n representing this package is repeatedly incremented (block d'14) and tach register 78 in the related active table position is repeatedly initialized at 186 (block d'17). Zone register 84 in this active table position 76n ultimately reads "7". The interrupt then reaches block d'16 to clear this table position 76n. The package leaves conveyor reject end R.

The above description deals with the first and each succeeding package that is scanned, then passes entry eye 45, and is transported along conveyor 40-1, and along following conveyor segments 42-1/40-2, 42-2/40-3, etc. During the routine operation of the apparatus, there are many packages distributed along the conveyor system. Interrupts arise at many postions of the system—for example from eye 45, from six eyes 46, and from twelve eyes 50. These interrupts and the related logic and computing operations occur at very high speed but are well within the capacity of a computer of modest cost. Processing of one interrupt may be completed before the next occurs, but if interrupts should occur more frequently, they are in effect lined up and utilized in sequence using customary computer techniques executed by block a'3.

The foregoing system goes into ALARM if a diverted package "hangs up" and fails to reach its eye 50 on time. A control might be provided to draw attention to a back-up of packages at each eject lane and separate detectors could be provided for that purpose. However, the foregoing system automatically covers the contingency of any back-up of packages in an eject lane. Such a package is diverted (after starting a timer related to that diverter) but it is blocked due to the assumed back-up of packages in that lane. It does not produce a timely light-to-dark change of the related eye 50, and the system goes into ALARM. Consequently, any pile-up of packages in an eject lane has the same effect as a package that hangs up at a diverter. The conveyor system stops (see below) both for hang-up of a package and for back-up of packages in an eject lane. The attendant locates the difficulty. All packages that failed to reach respective eyes 50 are placed back on the conveyor system. The related active table positions are not cleared. All packages in the backed-up lane that reached or passed their respective eyes 50 are pushed manually onto the order assembly tables.

Under a variety of conditions, diverting of packages to order assembly lanes 44 is aborted in a "flush" mode of conveyor operations, and the packages on the conveyor are delivered to the reject end R of the conveyor. All of the packages loaded onto the conveyor are presumably needed for completing the merchandise that is to be assembled at the various lanes 44 to fill the several orders. Any unlabeled packages thus discharged at the end R of the conveyor system are brought back to the loading end L of the conveyor system, for renewed program-controlled distribution. This includes any diverted package that failed to reach its acknowledgement eye 50 due to hang-up or back-up of packages in a divert lane 44. As noted above, only the active table positions corresponding to successfully diverted packages are cleared (block d'12, FIG. 11). Packages remaining on the conveyor system are represented by entries in active table positions 76 that have not yet been cleared. Some of the active table positions are routinely cleared (see above, block d'16, in FIG. 7).

The ALARM interrupts of FIGS. 4, 8, and 14 act to stop the conveyor system. If the attendant can readily correct the cause for the ALARM, the manual "Restart Conveyor" interrupt is used to resume distribution of packages on the conveyor. If there is any doubt as to reliability of the distribution, the "Flush" manual interrupt is used. This interrupt drops via connection B'2 (FIGS. 2 and 9) via connection B'6 (FIG. 13) to block b'17 to correct for items initially deducted from the order tables but not actually delivered to the corresponding order assembly lanes. Counters 68, 72 and 74 are incremented under control of registers 80 and 82 in the successive positions of the order tables. After each active table position 76n has served in the correction process, it is reset (block b'18) and the interrupt drops to block b'19 to test for any other active table positions containing entries. The sequence of blocks b'17, b'18 and b'19 is repeated until the last active table position has been used in the correction process and has then been cleared. The interrupt to decision block b'19 drops to block b'20 to disable eyes 46 (a precaution) and to block b'21 to restart the conveyor, returning to connection A'.

The restarted conveyor discharges the packages from the conveyor at reject end R. (Block b'21 may be omitted from the flow chart and replaced by an external manual control operated by the attendant to unload the conveyor.) After the conveyor has been unloaded completely, distribution of packages can be resumed with a "Restart" interrupt (described below). The packages at reject end R presumably were needed for filling the orders, and may be loaded on the conveyor again.

At some point, after every item in every order table has been supplied, counter 74 will read zero. If counter 74 does not read zero, the attendant may request a report showing missing items. (In preparation for such a report request, normally the system will be allowed to operate until the packages on the conveyor have been distributed.) For a report request a manual interrupt may be introduced for obtaining a status report listing the shortages, either by printing the amounts registered in all the temporary and permanent counters or by printing and/or displaying the differences between those counters, item-by-item, for all the orders as a shortage "pick list" and/or, order-by-order. Then the attendant may obtain some or all of the missing items and resume distribution of the packages. A later status report may show that the only shortages are in items that are out of inventory and cannot be supplied. The attendant then can operate controls that introduce a manual interrupt calling for shipping papers to be printed, based on order tables 60 and collateral information stored with those tables.

During production of any such report and at other times, the conveyor system is stopped. The conveyor system is started both initially and to resume the order-assembly operations by operating a manual control to produce a "restart" interrupt.

Like the "eye" and "scan" interrupts, "manual" interrupts enter the "wait" block a'2 (FIG. 2) and drop down to block b'2 (FIG. 9) via connection B'2. If the manual interrupt is for restarting the conveyor system, it drops to decision block b'3 (FIG. 10) via connection B'3. Here determination is made as to whether the order tables 60 contain data. If not, the interrupt to block b'4 causes production of an appropriate output message, and the program ends. If orders are listed for distribution, the "Restart" manual interrupt drops to decision block b'5. If the conveyor was at rest, the interrupt to block b'5a starts the convveyor. The interrupt from block b'5 (directly, or indirectly via block b'5a) drops to decision block b'5b for testing whether eyes 46 were disabled. If so, eyes 46 are enabled (block b'5c). In any case, the program returns to connection A'. The entire equipment is then in condition to receive packages, resuming the distribution process.

When a status report is wanted, ordinarily the attendant will stop loading packages on the conveyor and wait until the packages on the sorting conveyor have been distributed. A manual status report interrupt to the computer drops from block a'3 (FIG. 2) via connection B'2 to decision block b'6 (FIG. 9) and to block b'7 (FIG. 10) to stop the conveyor system. Decrementing of the tach registers 78 in the active tables is also suspended, because the tach pulse generator is operated by one of the belt conveyors. The interrupt drops to block b'8 where a decision is made as to whether an "E" report (status) or an "A" report (e.g. shipping papers) is wanted. If a status report is wanted, the interrupt drops to block b'9 to cause output printing of the order tables showing both the temporary and permanent registers. Additionally, the computer is programmed to print a consolidated list of the items in all of the orders not yet filled and the shortages as shown by the total of all registers 68 for each item separately. This constitutes a "pick list" of items to be obtained if available and loaded onto the sorting conveyor to fill the orders. The interrupt drops to block b'10 for outputting a message identifying the type of report, and the program returns to A' (FIG. 2).

Where a final "A" report is wanted, the manual interrupt drops through decision block b'8 and connection B'5 (FIG. 11) to block b'11 to print out data derived from tables 60, e.g. as a set of shipping papers, etc. The order tables accurately reflect the merchandise assembled at the various lanes 44-1 through 44-12 (this example). Shortages can be noted in the report, whether in the form of shipping papers or otherwise. The interrupt drops to block b'12 to print a message (if desired) indicating the kind of report; to block b'13 to transfer the data to off-line data processing equipment; to block b'14 to zero all counters; and to block b'15 to clear all order tables and active tables. The process of assembling the merchandise for that group of orders is complete, and the program can then STOP, or it can be extended to institute start-up steps for entering and then processing the next group of orders.

Returning to FIG. 9, if there were a manual interrupt other than a "restart", a report request or a "flush", the interrupt would drop down to block b'16, resulting in the printing of an "error" output message, and the program would return to connection A'.

As has already been noted, diverter electric eyes 46 have two functions: serving as part of a travel-speed monitoring means and in their role as selective diverter control means. Those detectors in the foregoing system are part of a travel-speed verifying means that enables a non-positive conveyor system to be used in a high-integrity order-assembling system. Instead of the dual-purpose detectors 46 of the apparatus in FIGS. 1-14 two separate series of detectors may be used for the separate functions of "window" or "slip" monitoring and for controlling the selective delivery of the packages. The term "window" refers to the permissible deviation between no-slip travel of a package and maximum permissible "slip" (0 to −38 or, referred to mean speed, ±18.) Where a separate series of detectors are used as part of a "window" detector system, they may be distributed appropriately along the conveyor system without concern for location of the diverter-control detectors.

It has also been noted that the apparatus of FIG. 1 can utilize a positive-advance type of conveyor system, or one that so nearly approximates a positive-advance system as to be its equivalent. Positive-advance conveyors are typified by the tilt-tray type but others are well known. Other forms of positive-advance conveyors are those that have "flights" or bars spaced apart along the conveyor path, carrying the packages in step with the conveyor drive. In a system like that of FIGS. 1-14, modified to utilize a positive-advance conveyor with a single scanner, the "slip" testing system represented by blocks a'18 and x'2 (FIGS. 2 and 14) may be superfluous. Registers 78, decremented by tach pulses, may be retained for tracking the packages.

In a contemplated modification of the system, some of the packages loaded onto the conveyor may have multiple units of certain items. The package code would then include both the item number and the quantity of units in that package. That package would accordingly be designated for delivery to an order assembly lane whose temporary counter 68 equals or exceeds that number of units. The number in a temporary counter 68 would be reduced by the plural number of units, and the quantity of units would be an additional entry in the active table position 76 representing that package. Subsequently, in case the conveyor is operated in its "flush" mode, the respective temporary registers 68 would be increased, not by "1" as in the above system, but by the actual number of units in the various packages represented by the additional entry in the active table.

A further exemplification of apparatus for processing a group or orders concurrently may assume the form of a common package-supplying location, a single device for entering package identifications into the computer, and selective conveyor segments that fan out to the several order assembly sites. However, the common-path conveyor systems with multiple diverters in FIG. 1 is characteristically low in cost and highly flexible, being adaptable for virtually all kinds of packages.

In a contemplated modification, the attendant of the apparatus in FIG. 1 could replace scanner 48, by manually entering the package-identifying code of each item. Such modified apparatus would retain the remainder of the system shown in FIGS. 1-14 as described above. However, visual product identification and entry are prone to error that would impair the high integrity of the automatic order-assembling system of FIGS. 1-14.

A further embodiment of the invention so resembles that of FIGS. 1-14 that it may be described in connection with those figures. The apparatus includes the single scanner and all of the conveyor structure of FIG. 1, and the computer is organized to include order tables, an active table and the other computer constituents in the above-described embodiment.

In this embodiment, the item number of a package at the loading end of the conveyor is entered at register 82 in its active table position 76n, omitting lane registers 80 and the related program steps. The initialized tach count is entered into the active table position 76n, and the tach counts of all the active table positions are decremented as in the previous embodiment. When a package breaks a diverter electric eye 46, the active table position corresponding to the package-breaking eye is located as before. The item number in that active table position is compared with the unfilled order or pair of orders (successively) related to the activated eye 46 and its diverter.

In this embodiment, the temporary counter 68 of an order is decremented when the diverter is activated to direct a package to the related order assembly site. Successful-divert eyes 50 can be used in this modification in much the same way as in FIGS. 1-14. In case a package that should be ejected does not break eye 50 when it should, the system may go into ALARM; and the reduced count in counter 68 can then be increased to correct for the failure of the apparatus to eject the package successfully. With few exceptions, the program of this modification remains the same as in FIGS. 1-14. Status reports and final reports are obtained as before, etc.

In the apparatus of FIGS. 1-14, the requirements in the first order 60-1 for any item are filled before units of that item are designated for any other order of the group. This may meet a commercial objective. If there is any item in short supply, there may be a valid reason to assign priority to certain orders by ranking them early in the group. The priority orders will be filled first, so long as a limited supply of an item lasts, before the lower-priority orders obtain any units of that item. The apparatus is not limited to that mode of operation. Instead, the program can be set up to distribute successive units of a given item to successive orders of the concurrently processed group or orders. This is illustrated generally in FIG. 15.

The items needed to fill all the orders of a group may be arranged in a "pick list", column 66' in FIG. 15. The computer is organized internally to conform, in operation, to this table. The quantities of any item in the first order #430 related to order assembly lane 1 (col. 62'-1) are entered in temporary counter 68'-1 and permanent counter 70'-1. If the first item in the pick list is also needed in order #431, to be delivered to assembly lane 2 (col. 62'-2), the quantity is entered in the temporary counter of Col. 68'-2, etc. The total requirements for that item in all the orders is entered in a register for that purpose (reg. 72' in FIG. 15). If all twelve orders of the group require a particular item, the quantities are entered into counters 68'-1 . . . 68'-12 and 70'-1 . . . 70'-12. A "lane index" counter or register 86 is provided for each item in the table.

FIG. 16 represents a modification of the flow chart of FIGS. 2/3 to implement the plan of distribution of successive units of an item to successive orders requiring that item. All other flow charts of FIGS. 4-14 remain unchanged, and the flow chart of FIG. 2 remains unchanged up to block a'7b and after block a'10.

An interrupt from block a'7 drops to block a'8a (FIG. 16) to locate the address of the item as represented in the table of FIG. 15. The interrupt drops to block a'8b to test the total item quantity register 72'. If it is "0", the interrupt to block a'8c sets the "reject" lane number such as "99" in the related active table position 76'n (like block a'9, FIG. 2), the program then returning to connection A'. If the item register is not "0", then the interrupt to block a'8d causes "1" to be added to the corresponding lane index counter 86. The interrupt to decision block a'8e next tests whether that lane index counter equals "13", that is, one more than the group of twelve orders being processed in this example. If "yes", then the interrupt to block a'8f causes "1" to be moved into the lane index counter 86. In any case, the interrupt to block a'8g causes the temporary quantity counter 68' of lane 62'-n (FIG. 15) to be tested. If counter 68' of that lane 62'-n is zero, again "1" is added to the lane index counter 86 of this item; and this sequence is repeated until the first lane/order 62'-n needing this item is located. The program reverts to that of FIG. 2 at this point, block a'10. The lane number may be entered into the lane register 80 of the next available active table position 76'n and "1" is deducted from the related order temporary counter 68', item total counter 72', and from the grand total counter if used. The program then returns to connection A'.

The tracking system descibed above in connection with FIGS. 1-14 is represented in FIG. 17A. A package is tracked in the active table by zone number and tach number. For conveyor segment 40-1, the package carried by the conveyor is identified in an active table position 76n as 1:108, 1:107 ... 1:10 ... 1:−37, 1:−38 and 1:−39 (ALARM) in the course of conveyor travel, while tach pulses are being produced by tach pulse generator 52. For the conveyor segment of diverter 42-1 in its non-divert mode plus belt conveyor 40-2, the package is tracked by the numerals 2:186, 2:185 ... 2:0 ... etc. That numerical scheme can, of course be varied endlessly. Thus, instead of counting from 103 down to 0 and to −39 (ALARM) for a package traveling along short conveyor 40-1, and from 186 down to 0 and −39 (ALARM) for a package traveling along the following segments 42-1/40-2; 42-2/40-3, etc., FIG. 17B shows an equivalent scheme in which the tach counts increase after being initialized appropriately. In this form, minimum travel time occurs when any tach register 78' attains 186 for all the conveyor segments and the ALARM condition occurs at a count of 225. Each tach register 78 is initialized by an entry of "78" for zone "1" (a short zone) to attain the same test numbers "186" and "225" as for the following longer zones. Moreover, the zone number and the tach counts can be merged into a composite number as indicated in FIG. 17C. Of course, the computer is to be programmed accordingly to recognize specific numbers in the continuous sequence as signifying "minimum travel time" and "ALARM" for each monitored travel segment. These examples provide a "window" to accommodate varying "slip" within an allowable range and to signal ALARM when excessive "slip" may signify doubtful tracking of a package. Each tracking regime includes the feature of initializing the tach register as any package enters upon each new segment of the conveyor system to avoid pyramiding of deviations within the permissible range of slip occurring along each of the preceding conveyor segments. In this way, the tracking of any package versus the conveyor travel starts anew each time that package enters a new segment of the conveyor system. The process of repeatedly initializing the tach counts avoids pyramiding of the changeable degrees of slip occurring in the successive conveyor segments.

Where large shipping cartons are to be labeled with the address of the consignee, the timing and the proportions of the conveyor system may be modified appropriately. In a further modification, the text to be applied to each package may exceed the capacity of any one labeling device. In that case, it is contemplated that both of the labeling devices should apply labels to each package, and then the entire text to be applied to each package would be shared by the labeling devices. In that case, blocks a'11-3 through a'11-9 (FIG. 3) and blocks c'1 and c'3 (FIGS. 5 and 6) would be omitted.

The apparatus of FIGS. 1-14 may be used for addressing packages such as books to supply a vast number of orders concurrently, such as a subscription list. The sorting feature could then be omitted. However, the sorting feature of the described apparatus could be retained and used to great adventure by sorting the packages in groups corresponding to postal zone areas. Here again, the sorting function does not depend on identification of the package contents, but on part of the storage in the computer order tables, namely, part of the postal zone in the consignee's address.

The foregoing description of several illustrative embodiments of the invention in its various aspects is of course subject to numerous variations and further modification by those skilled in the art. Therefore, the invention should be construed broadly in accordance with its full spirit and scope.

What is claimed is:

1. Apparatus for processing a group of orders of various customers, wherein each order typically includes requirements for specified items, and where various items are supplied to the apparatus, all items of the same variety having corresponding characterizations that differ from the characterizations of items of different varieties, said apparatus including (i) order recording means including means for storing customer-related data for each order of the group and means for storing the requirements of each of the orders for the specified items of the order, (ii) scanning means for registering the characterization of each item supplied to the apparatus, (iii) labeling means for applying customer-related data to at least some of the supplied items, (iv) allocating means jointly responsive to the scanning means and the order recording means for allocating each scanned item to one of the orders, if any, among those orders for which there is a stored requirement for the same variety of item as the scanned item, said allocating means comprising (a) means for selecting one of said orders, if any, having such stored requirement, and (b) means for controlling said labeling means to label each item whose registered characterization corresponds to a stored requirement in the selected order with customer-related data in accordance with the selected order, and (v) accounting means for limiting the allocation of items scanned by the scanning means to those orders represented in said order registering means whose storing means contain requirements for the same variety of item as the scanned item exceeding prior allocations of such variety of items to such orders, respectively, in processing the group of orders.

2. Apparatus as in claim 1 wherein said labeling means includes selective printing means controlled by said means for storing customer-related data for printing such customer-related data.

3. Apparatus as in claim 1 wherein said means for storing the customer related data includes means for storing the customer's name and address and wherein said labeling means includes selective printing means for printing the customer's name and address in labeling respective scanned items.

4. Apparatus as in claim 3 wherein said selective printing means is arranged to print a succession of labels and wherein said laabeling means includes means for applying each newly printed label to the related scanned item.

5. Apparatus as in claim 1, further including means for conveying items successively past said scanning means and said labeling means.

6. Apparatus as in claim 1, further including means for conveying items successively past said scanning means and said labeling means, wherein said conveying means includes sortation means responsive to said allocating means for delivering said labeled items to order-assembly sites related respectively to said customers.

7. Apparatus as in either in claim 5 or 6 wherein said labeling means includes at least two labeling devices each of which includes a printer controlled selectively by said order recording means for printing said order-related data on a label and means for applying each newly printed label to an item, said apparatus including means to coordinate said labeling devices so that, while one such labeling device is labeling any one item, another such labeling device is being prepared to label another item following said one item on said conveying means.

8. Apparatus for processing orders of various customers, wherein each order typically includes a list of specified items and specified quantities of those items, and wherein various items are supplied to the apparatus, all items of the same variety having corresponding characterizations that differ from the characterizations of items of different varieties, said apparatus including i. order recording means including means for storing customer-related data of each of the orders, means for storing representations of the varieties of items specified in the orders, and quantity storing means for storing a representation of the specified quantity of each variety of item in each of the orders, ii. scanning means for registering the characterization of each item supplied to the apparatus, iii. labeling means for applying customer-related data to at least some of the supplied items, iv. allocating means jointly responsive to the scanning means and the order registering means for (a) locating and selecting an order, if any, having a stored representation of the variety of item corresponding to the registered characterization of each scanned item, and for (b) controlling said labeling means (b.1) to label only those items whose registered characterizations correspond to stored representations of items in the registered orders, respectively, and (b.2) to select customer-related data to be applied by the labeling means in accordance with the selected order, thereby allocating such items to the selected orders, respectively, and (v) accounting means for limiting the allocation of any particular item scanned by the scanning means to one of the orders having a quantity representation of the same variety of item as the scanned item in its quantity storing means that exceeds the aggregate prior allocations to that order of items having a stored representation corresponding to the characterization of said particular item.

9. Apparatus for processing a group of orders of various customers, wherein each order typically includes requirements for specified items, all items of the same variety having corresponding characterizations that differ from the characterizations of items of different varieties, said apparatus including (i) order recording means including means for storing customer-related data for each order of the group and means for storing net requirements of each of the orders for the specified items of each order, a net requirement being the requirement for an item specified in an order as reduced in the course of the operation of the apparatus in processing the group of orders, (ii) scanning means for registering the characterization of each item supplied to the apparatus, (iii) labeling means for applying customer-related data to at least some of the supplied items, (iv) allocating means jointly responsive to the scanning means and the order registering means for allocating each particular scanned item to one of the orders, if any, among those orders whose storing means has a stored net requirement for the same variety of item as the scanned item, said allocating means comprising (a.) means for selecting such an order based on correspondence between the registered characterization of each particular scanned item and the stored net requirement for an item of the same variety in the selected order, and (b.) means for controlling said labeling means to label only those particular scanned items with customer-related data in accordance with the selected orders, and (v) accounting means responsive to said allocating means for adjusting respective ones of said net requirements storing means related to items being allocated to the orders for thereby limiting subsequent allocations to orders having unfilled requirements for subsequently scanned items.

10. Apparatus as in any of claims 2–6, wherein said labeling means includes plural labeling devices operable in sequence to label successively allocated items or.

11. Apparatus as in claim 8 or 9, further including means for conveying items successively past said scanning means and said labeling means, said conveying means including sortation means responsive to said allocating means for delivering said labeled items and packages to order-assembly sites related respectively to said customers.

12. Apparatus as in claim 1, 7, including a conveyor for transporting successive items, as supplied to the apparatus, to said scanning means and thereafter to said labeling means.

13. Apparatus as in claim 12, wherein said labeling means includes plural labeling devices operable in sequence to label successively allocated items so that, while one such labeling device is labeling any particular item or package, another such labeling device is being prepared to label another item or package following said particular item or package.

14. Apparatus as in either of claims 8 and 9 wherein said labeling means includes plural labeling devices operable in sequence to label successively allocated items or packages of items.

15. A method of concurrently processing plural orders of various customers, wherein each order typically includes specified items and a specified quantity of each of those items, all items of the same variety having corresponding characterizations that differ from the characterizations of different varieties of items, including the steps of (i) recording data representing the orders to be processed including the orders and characterizations of the specified items for said orders and a representation of the specified quantity of each item of each order, (ii) supplying a succession of items corresponding at least approximately to the sum of the quantities of all the items in the orders to be processed concurrently, (iii) registering the characterization of each of the succession of supplied items, (iv) comparing the registered characterization of each of said succession of supplied items to the recorded characterizations of items for said orders and, where a recorded characterization of an item for an order is located that corresponds to the registered characterization of a supplied item, allocating that supplied item to the located order by selecting such order and labeling such item with data particularly related to the selected order, (v) keeping account of each item allocated to each of said orders, and (vi) limiting the allocation of supplied items whose characterizations are registered to only those recorded orders wherein the specified quantities of such items exceed the prior allocations of such items in such orders, respectively.

16. The method as in claim 15, further including the step of conveying the item or items allocated as aforesaid to corresponding order-assembling sites.

17. A method as in claim 15 wherein an address of the recorded data representing the customer is stored as part of each order and wherein the data in the labeling comprises at least an address of the customer.

18. A method of concurrently processing plural orders of various customers, wherein each order typically includes a list of various specified items, all items of the same variety having corresponding characterizations that differ from the characterizations of items of different varieties, including the steps of (i) recording data identifying a series of orders and recording the characterizations of the items specified in the orders so as to show the items required for each of the orders, (ii) supplying a succession of items corresponding at least approximately to the items in the orders to be processed concurrently, (iii) registering the characterization of each of the succession of supplied items, (iv) comparing the registered characterization of each of said succession of supplied items to the recorded characterizations of items in the orders to locate and select an order that requires an item whose recorded characterization corresponds to the registered characterization of a supplied item, and (v) labeling each such required item with data particularly related to such order.

* * * * *